Oct. 25, 1938.　　　　S. P. ANDELENIS　　　　2,134,594
DEVICE FOR DISPLAYING A LICENSE PLATE
Filed Nov. 1, 1937
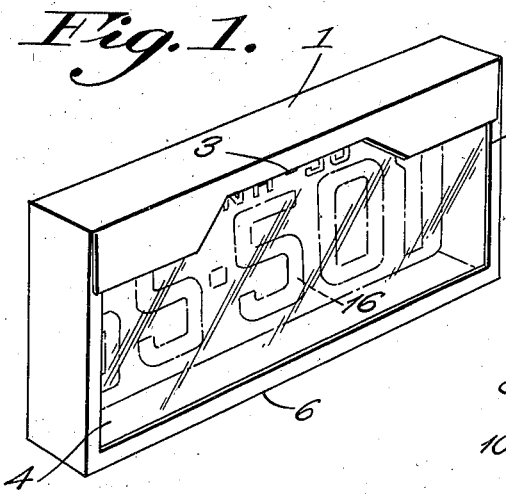
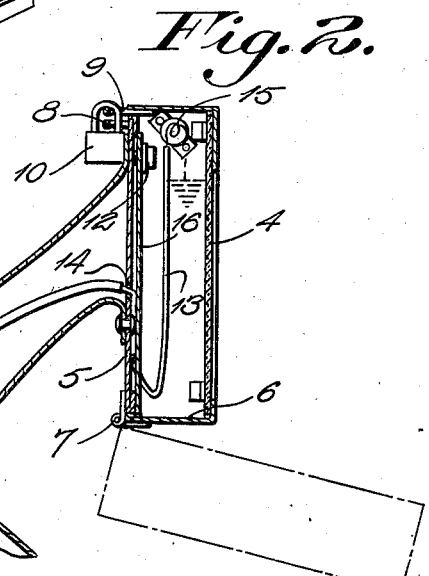
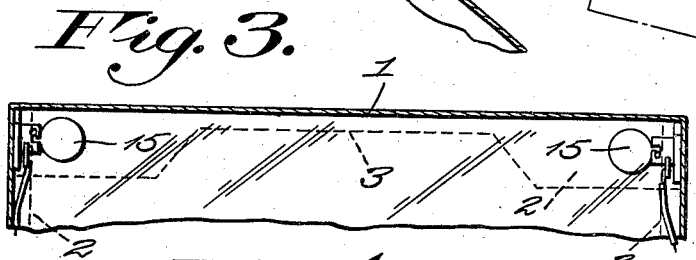
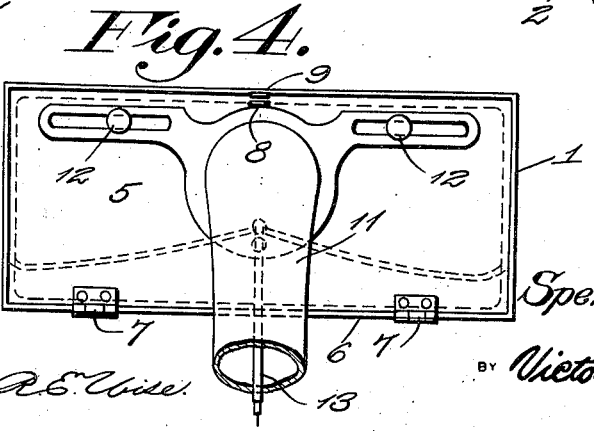
Speros P. Andelenis
INVENTOR
BY Victor J. Evans & Co.
ATTORNEYS
WITNESS Patented Oct. 25, 1938

2,134,594

UNITED STATES PATENT OFFICE 2,134,594

DEVICE FOR DISPLAYING A LICENSE PLATE

Speros Peter Andelenis, Concord, N. H.

Application November 1, 1937, Serial No. 172,274

1 Claim. (Cl. 40—132)

This invention relates to a device for the display of license tags for motor vehicles and has for the primary object the provision of a device of this character in which a license plate may be secured against theft with all characters thereof clearly exposed to view and illuminated when desired so that the license plate may be read from a maximum distance at night time and due to the construction of the device, the license plate will be shielded from direct glare of the sun or other outside light as well as dirt, dust and the like.

With these and other objects in view, this invention consists in certain novel features of construction, combination and arrangement of parts to be hereinafter more fully described and claimed.

For a complete understanding of my invention, reference is to be had to the following description and accompanying drawing, in which—

Figure 1 is a perspective view illustrating a device for displaying license plates.

Figure 2 is a fragmentary transverse sectional view showing the device mounted on a portion of the motor vehicle.

Figure 3 is a fragmentary vertical sectional view illustrating the device.

Figure 4 is a fragmentary rear elevation illustrating the device supported by a bracket carried by the motor vehicle.

Referring in detail to the drawing, the numeral 1 indicates a rectangular casing, the front wall of which is cut away to form a window opening surrounded by marginal flanges 2, the upper one of which is of a greater width than the others to provide what may be termed a hood and has a central cutaway portion 3. The flanges 2 form rests for a transparent panel 4 mounted in the casing and acting to close the window. The rear wall 5 of the casing is separable from the other walls and hinged to the bottom wall of the casing, as shown at 7, and is provided with a keeper element 8 coacting with a keeper element 9 on the casing to receive a padlock 10. A supporting bracket 11 is secured on the back wall by fasteners 12 and is adaptable for mounting on a motor vehicle and preferably of hollow formation to permit electrical conductors 13 to extend therethrough. The electrical conductors form a part of the electric illuminating system of the motor vehicle and enter the casing by way of an opening 14 in the back wall and are connected to electric lamps 15 mounted in the casing. A license plate 16 is secured on the back wall by certain of the fasteners 12 so that the characters of the license plate may be clearly viewed by way of the window of the casing and the hood tends to shield the plate from direct glare of the sun or other outside light, but the cutout portion 3 thereof permits all of the characters of the license plate to come in view. When it is necessary to change license plates, it is only necessary that the padlock 10 be removed and the casing swung away from the rear wall, as shown in dotted lines in Figure 2. The license plate already mounted on the back wall then can be easily removed and another substituted therefor.

What is claimed is:

A device for displaying a license plate, comprising a rectangular casing having a window opening in the front thereof, marginal flanges about the opening, the upper flange being of greater width than the others to provide a hood and having a central cut out portion, a transparent panel mounted in the casing for closing the window opening, said casing including a rear wall hinged to the bottom wall thereof, fasteners for securing said rear wall on a supporting bracket, and acting to secure on the rear wall within the casing a license plate visible through the panel, keepers secured to the rear wall and the upper wall of the casing to receive a padlock, and means within the casing to illuminate the license plate.

SPEROS PETER ANDELENIS.